United States Patent
Hu et al.

(10) Patent No.: US 6,627,847 B1
(45) Date of Patent: Sep. 30, 2003

(54) METHOD AND APPARATUS FOR THROUGH-BODY OPTICAL COMPONENT ATTACHMENT USING LASER SOLDERING

(75) Inventors: Chaolin Hu, Billerica, MA (US); Parviz Tayebati, Wilmington, MA (US); Masud Azimi, Nashua, NH (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 10/021,975

(22) Filed: Dec. 13, 2001

Related U.S. Application Data

(60) Provisional application No. 60/301,664, filed on Jun. 28, 2001.

(51) Int. Cl.[7] ............................................. B23K 26/20
(52) U.S. Cl. .............................. 219/121.85; 219/121.64
(58) Field of Search ........................ 219/121.85, 121.63, 219/121.64, 121.65, 121.66; 228/180.22, 180.21, 254, 122.1, 248.1

(56) References Cited

U.S. PATENT DOCUMENTS

| | | | | |
|---|---|---|---|---|
| 4,033,668 A | * | 7/1977 | Presby | 385/95 |
| 4,963,714 A | * | 10/1990 | Adamski et al. | 219/121.63 |
| 5,553,182 A | * | 9/1996 | Haake | 385/89 |
| 5,635,764 A | * | 6/1997 | Fujikawa et al. | 257/766 |
| 5,692,086 A | * | 11/1997 | Beranek et al. | 385/94 |
| 6,074,104 A | * | 6/2000 | Higashikawa | 385/94 |
| 6,146,025 A | * | 11/2000 | Abbink et al. | 385/88 |
| 6,164,837 A | * | 12/2000 | Haake et al. | 385/90 |
| 6,318,910 B1 | * | 11/2001 | Higashikawa | 385/94 |
| 6,319,617 B1 | * | 11/2001 | Jin et al. | 428/469 |
| 6,335,548 B1 | * | 1/2002 | Roberts et al. | 257/98 |
| 2001/0026664 A1 | * | 10/2001 | Tanaka et al. | 385/92 |

* cited by examiner

*Primary Examiner*—Tom Dunn
*Assistant Examiner*—Jonathan Johnson
(74) *Attorney, Agent, or Firm*—Nortel Networks

(57) ABSTRACT

According to an aspect of the present invention, a method for laser soldering optical components is described. In that method, a first selected material is disposed on the components to facilitate the deposition of solder. Subsequently, solder is disposed on that material and the component is aligned. A laser beam is properly focused on the solder such that the solder melts and, when the laser beam is turned off, hardens, thereby fixing the component in the desired position.

8 Claims, 2 Drawing Sheets

METHOD AND APPARATUS FOR THROUGH-BODY OPTICAL COMPONENT ATTACHMENT USING LASER SOLDERING

This Non-provisional patent application claims priority to Provisional Patent Application "Method and Apparatus for Through-Body Optical Component Attachment using Laser Soldering" filed on Jun. 28, 2001 having Ser. No. 60/301,664 and having inventors Chaolin Hu, Parviz tayebati and Masud Azimi.

BACKGROUND OF THE INVENTION

As it is known in the art, many optical devices are comprised of a number of different individual components that are arranged to produce a desired function. These individual components each have their own optical centerline where optimum performance is achieved. Accordingly, as the individual components are placed within an optical component device, each component's optical centerline is aligned with the optical centerline for the overall device. Many sophisticated methods of optical alignment are used in this process but are typically based on a laser beam and receiver arrangement. With such an arrangement the laser beam delineates the desired optical centerline of the overall device and the throughput of each successively placed component is maximised, as determined by the level of optical power reaching the detector.

When optimal placement for an individual component is achieved, it is secured in place such that vibrations and normal handling stresses induced in the overall device will not change the functionality of that device. In the past, individual components have typically been secured using UV curable epoxy cement. Once the component alignment is achieved, the mechanism holding the component is frozen in place and epoxy is deposited between the component and the substrate or other secure platform. An ultra-violet (UV) light source is subsequently turned on so that it illuminates the epoxy. The epoxy typically takes a relatively long period of time to cure. During that period, the component can shift, thereby changing the optimised alignment and hence degrading the performance of the entire device.

What is needed is a method for securing optical components that takes a shorter period of time. With such a method, components can be secured with little risk of being misaligned.

SUMMARY OF THE INVENTION

In accordance with an aspect of the present invention, A method for laser soldering an optical component in a desired position is shown. The method involves disposing a first material, such as Titanium, on a portion of the optical component. Other materials can also be used that are sufficient to bond to both the optical component and to the selected type of solder. The solder is disposed over that material and the component is optimally positioned. Once the component is in position, a laser beam is focused on the solder, thereby melting it. The laser beam is then stopped from being incident on the solder, allowing it to harden. Accordingly, the optical component is laser soldered into position.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings.

DESCRIPTION OF A PREFERRED EMBODIMENT

Figure 1:
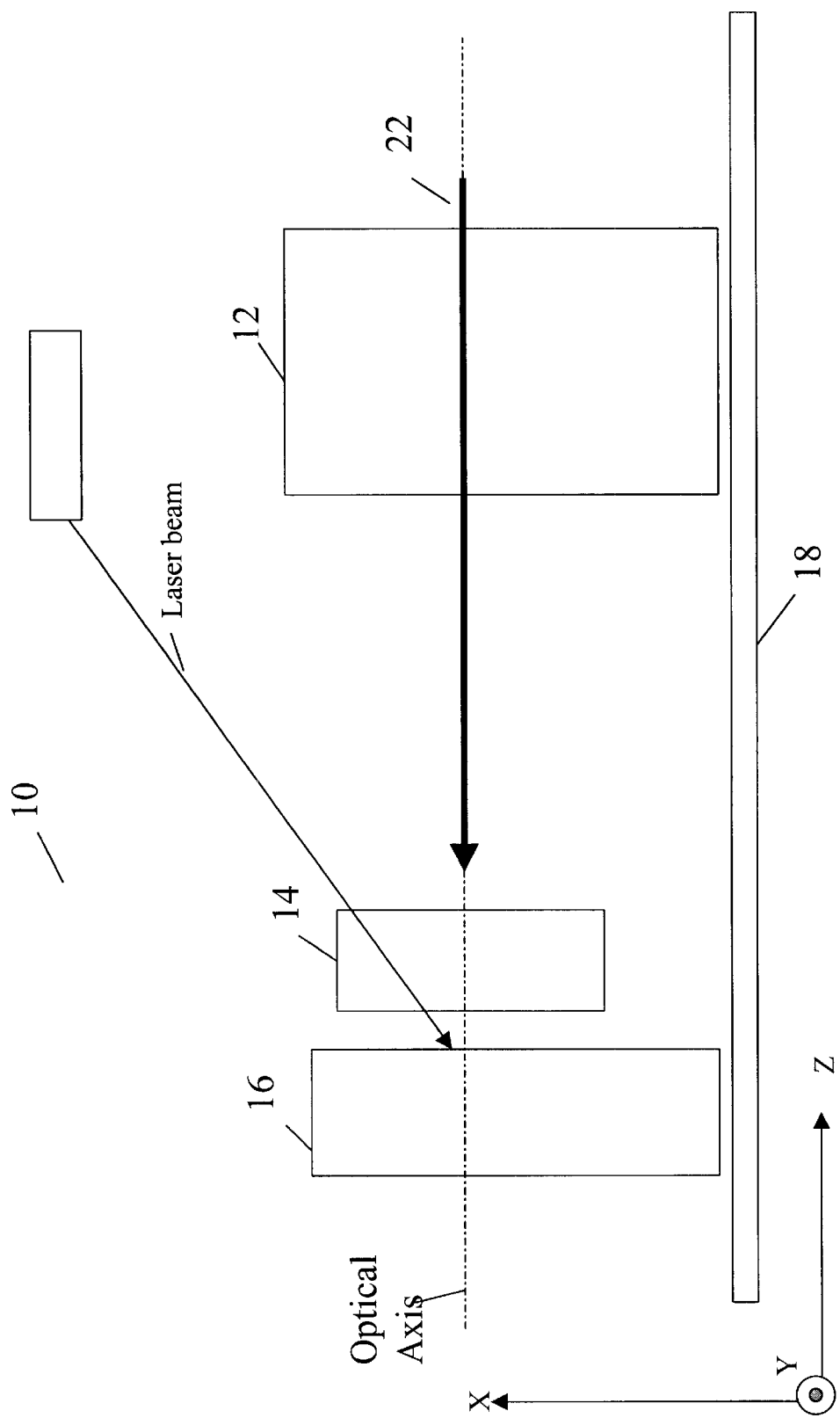
FIG. 1 is a block diagram of a configuration of aligned optical components secured according to the present invention.

Referring to FIG. 1, a block diagram of a configuration 10 of aligned optical components 12 and 14 is shown in relation to the device substrate 18 and the component submount 16. Optical components 12 and 14 are not limited to any particular type of optical component however, for exemplary purposes, optical component 12 can be a lens and optical component 14 can be a vertical cavity surface emitting laser (VCSEL). With such an arrangement, the lens 12 focuses pump laser light 22 into the cavity of VCSEL 14. Alternatively, optical components 12 and 14 could be a pair of lenses, that collectively is part of a larger configuration of optical components.

Regardless of the type of component, in order for the overall configuration to operate efficiently, optical component 14 should be optimally aligned with optical component 12 along the optical axis 22 in three dimensions (X, Y and Z). Once such optimal alignment is achieved, optical component 14 is attached to submount 16. In the past, such attachment, and similar attachments to the substrate, would have been performed using UV curable epoxy cement. The epoxy would be deposited on the component in the areas to contact the submount 16 and the UV light source turned on such that it illuminated the epoxy areas closest to the submount. A problem that arises with such a methodology is that the process of curing the epoxy is relatively time consuming. While the Epoxy is curing, the components are susceptible to movement. If the components move, the optimal alignment that is key to device performance, is compromised. A further problem is that, in some cases, the placement of the component does not easily lend itself to UV illumination. Therefore, both of these problems lead to slower manufacturing time, reduced device yields and lower device performance.

Given that a typical optical manufacturing line produces thousands of devices per day, any time added to the manufacturing operation and any increase in the failure rate adds significant expense to the device and reduces the total number of devices that can be produced within a given time period.

Figure 2:
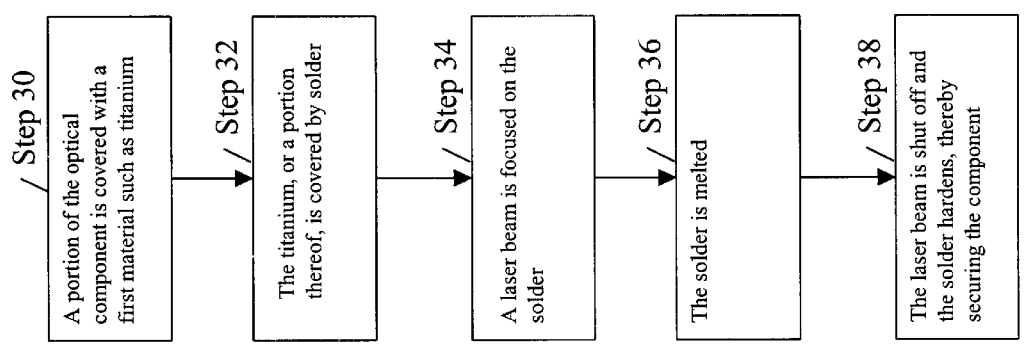
FIG. 2 is a flow diagram depicting the method of securing the components as shown in FIG. 1.

Accordingly, a novel method for securing such components will now be described with respect to the flow diagram of FIG. 2 in conjunction with FIG. 1. That method involves a procedure for laser soldering the component to a fixed portion of the optical device such as submount 16, substrate 18 or another optical or non-optical component, such as component 12. Generally, the portion of the component to be secured and the fixed element or component that it is attached to, are covered with a first material having sufficient glass adhesion properties (Step 30), referred to in the art as the property of "wetability". One example of such a material is titanium. Other materials having high energy absorption characteristics and sufficient glass wetability can also be used. Some of these alternative materials are molybdenum, nickel, niobium, rhenium and tungsten.

After the selected portions are covered with the first material, the same areas covered by the first material, or selected portions thereof, are covered with solder (Step 32). The solder used in this process can be any solder having a melting temperature lower than that of the components being soldered and having good bonding characteristics with the first material (here Titanium). Otherwise, the components will melt before the solder does, thereby destroying the device. Accordingly, in the preferred embodiment where the solder is to be joined with Titanium, a solder having approximately 80% gold (Au) and 20% tin (Sn) has been effectively used.

Because the optical components are made of glass and/or other materials that allow light to pass through their bodies, a laser beam can be focused on the solder for a selected period of time, through the component body (Step 34). It should be noted that, where direct access to the solder can be achieved, the laser light can be focused directly on the solder without passing through the optical component. Accordingly, the power in the laser heats the solder allowing it to flow along the body of the component and the structure to which it is being attached (Step 36). When the laser is shut off, the solder hardens and the component is securely fastened (Step 38). It should be noted that, depending on the power of the laser, the light beam might be de-focused to a point where optimal solder melting is achieved.

Because the solder hardens almost instantly and the solder layer is very thin (several microns in thickness), whose melting and solidification is the major reason for the shift in this case, the optical component's shift is confined within a minimum level. Accordingly, unlike the prior art methodologies, the optimal alignment that was achieved prior to soldering is maintained.

It will be recognised by one of ordinary skill in the art that when the solder is deposited, it can be either deposited on the component being fixed in place or on the structure to which it is being attached. For example, where a component is being attached to a submount, the solder can be placed over the titanium on the component or on the titanium on the submount. Likewise, where two components are being attached to one another, the solder can be disposed on either component.

It will be recognised that many configurations similar to those described above can be designed using different materials, values, combinations and architectures which will yield the same results as the claimed invention. Thus, while this invention has been particularly shown and described with references to preferred embodiments herein, it is understood by those skilled in the art that various changes in form and details may be made therein without departing from the scope of the invention as defined by the appended claims.

What is claimed is:

1. A method for laser soldering an optical component in a desired position, comprising the steps of:

disposing a first material on a portion of said optical component, said first material capable of bonding to said optical component and to a solder material;

disposing said solder material onto at least a portion of said first material;

positioning said optical component at the desired position;

illuminating through said optical component at least a portion of said solder material with a laser beam such that said solder material melts; and stopping said illumination such that said solder material hardens, thereby fixing said optical component in said desired position.

2. The method for laser soldering an optical component, as described in claim 1, wherein said first material comprises one or more materials selected from a group consisting of molybdenum, titanium, nickel, niobium, rhenium, tungsten.

3. The method for laser soldering an optical component, as described in claim 1, wherein said solder material is comprised of approximately 80% gold and approximately 20% tin.

4. The method for laser soldering an optical component, as described in claim 1, wherein said optical component comprises a lens.

5. The method for laser soldering an optical component, as described in claim 1, wherein said illumination step comprises transmitting said laser beam through another optical component onto said solder material.

6. The method for laser soldering an optical component, as described in claim 5, wherein said another optical component is a lens.

7. The method for laser soldering an optical component, as described in claim 1, further comprising focusing said laser beam onto said solder material.

8. The method for laser soldering an optical component, as described in claim 1, comprising defocusing said laser beam to control the melting of said solder material.

\* \* \* \* \*